United States Patent
Filippi et al.

(10) Patent No.: US 8,071,059 B2
(45) Date of Patent: Dec. 6, 2011

(54) CHEMICAL REACTOR

(75) Inventors: Ermanno Filippi, Castagnola (CH);
Enrico Rizzi, Casnate Con Bernate (IT);
Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 0 days.

(21) Appl. No.: 12/649,615

(22) Filed: Dec. 30, 2009

(65) Prior Publication Data

US 2010/0129283 A1    May 27, 2010

Related U.S. Application Data

(62) Division of application No. 10/557,008, filed as application No. PCT/EP2004/004422 on Apr. 27, 2004, now Pat. No. 7,807,115.

(30) Foreign Application Priority Data

May 16, 2003 (EP) .................................. 03011209

(51) Int. Cl.
*B01J 8/04* (2006.01)
*F28D 7/00* (2006.01)

(52) U.S. Cl. ........ 422/646; 422/200; 422/201; 165/157; 165/145

(58) Field of Classification Search ............... 422/200, 422/201, 646; 165/157, 145
See application file for complete search history.

(56) References Cited

U.S. PATENT DOCUMENTS

| | | |
|---|---|---|
| 3,796,547 A | 3/1974 | Muenger |
| 2002/0018740 A1 | 2/2002 | Filippi et al. |
| 2002/0088613 A1 | 7/2002 | Filippi et al. |
| 2003/0039601 A1 | 2/2003 | Halvorson et al. |
| 2003/0175184 A1 | 9/2003 | Filippi et al. |

FOREIGN PATENT DOCUMENTS

| | | |
|---|---|---|
| DE | 2803945 A1 | 8/1978 |
| DE | 10031347 A1 | 1/2001 |
| EP | 1060788 A1 | 12/2000 |
| EP | 1153653 A1 | 11/2001 |
| WO | 03/035241 | 5/2003 |

*Primary Examiner* — Walter Griffin
*Assistant Examiner* — Lessanework Seifu
(74) *Attorney, Agent, or Firm* — Akerman Senterfitt

(57) ABSTRACT

A chemical reactor for catalytic reactions, comprises a substantially cylindrical shell (2) closed at the opposite ends by respective covers (3 and 4), at least one reaction zone (7, 8) in which a respective catalytic bed (9, 10) and a plurality of heat exchangers (25) placed in said at least one reaction zone (7, 8) are supported.

2 Claims, 2 Drawing Sheets

CHEMICAL REACTOR

CROSS-REFERENCE TO RELATED APPLICATIONS

This application is a divisional of U.S. patent application Ser. No. 10/557,008, filed Nov. 16, 2005, which is a §371 National Phase of PCT/EP2004/004422, filed Apr. 27, 2004, the entirety of which is incorporated herein by reference.

FIELD OF APPLICATION

The present invention refers to a chemical reactor for catalytic reactions.

In particular, the present invention relates to a chemical reactor of the type comprising a substantially cylindrical shell closed at the opposite ends by respective covers, a reaction zone defined within said shell in which at least one catalytic bed is supported.

More in particular, the present invention is concerned with a chemical reactor of the above-identified type wherein the said at least one catalytic bed is of the "pseudo-isothermal" type, i.e. wherein the reaction temperature is controlled within a limited range of values around a predetermined optimal value.

PRIOR ART

As is known, in the field of catalytic reactions, the requirements of increasing the production capacity and reaction yield and, at the same time, reducing the energy consumption as well as the installation and operating costs of the chemical reactors designed for carrying out said catalytic reactions, are more and more felt.

To this aim, in the prior art, many type and configuration of pseudo-isothermal chemical reactors have been proposed.

With the term "pseudo-isothermal reactors" we mean to identify reactors for chemical reactions in which the reaction temperature in the reaction zone is controlled within a limited range of values around a predetermined optimal value by means of heat exchange elements such as tube heat exchangers or plate heat exchangers.

However, although advantageous in same aspects, none of the reactors according to the prior art is capable of fulfilling both requirements at the same.

In fact, when they are particularly suited for high production capacity and reaction yield, they have usually the drawbacks of being constructively complex and requiring high energy consumption as well as high operation and maintenance costs, and vice versa.

SUMMARY OF THE INVENTION

The technical problem underlying the present invention is that of providing a chemical reactor of the aforementioned type having structural and functional characteristics such as to allow high production capacity and conversion yield and at the same time requiring low energy consumptions as well as low installation and operating costs.

The aforementioned technical problem is solved by a chemical reactor for catalytic reactions as described and claimed in the attached claims.

Further characteristics and advantages of the invention will become clearer from the detailed description of an embodiment of a chemical reactor according to the invention, given hereafter with reference to the attached drawings, for indicative and non-limiting purposes.

DETAILED DESCRIPTION OF A PREFERRED EMBODIMENT OF THE INVENTION

Figure 1:
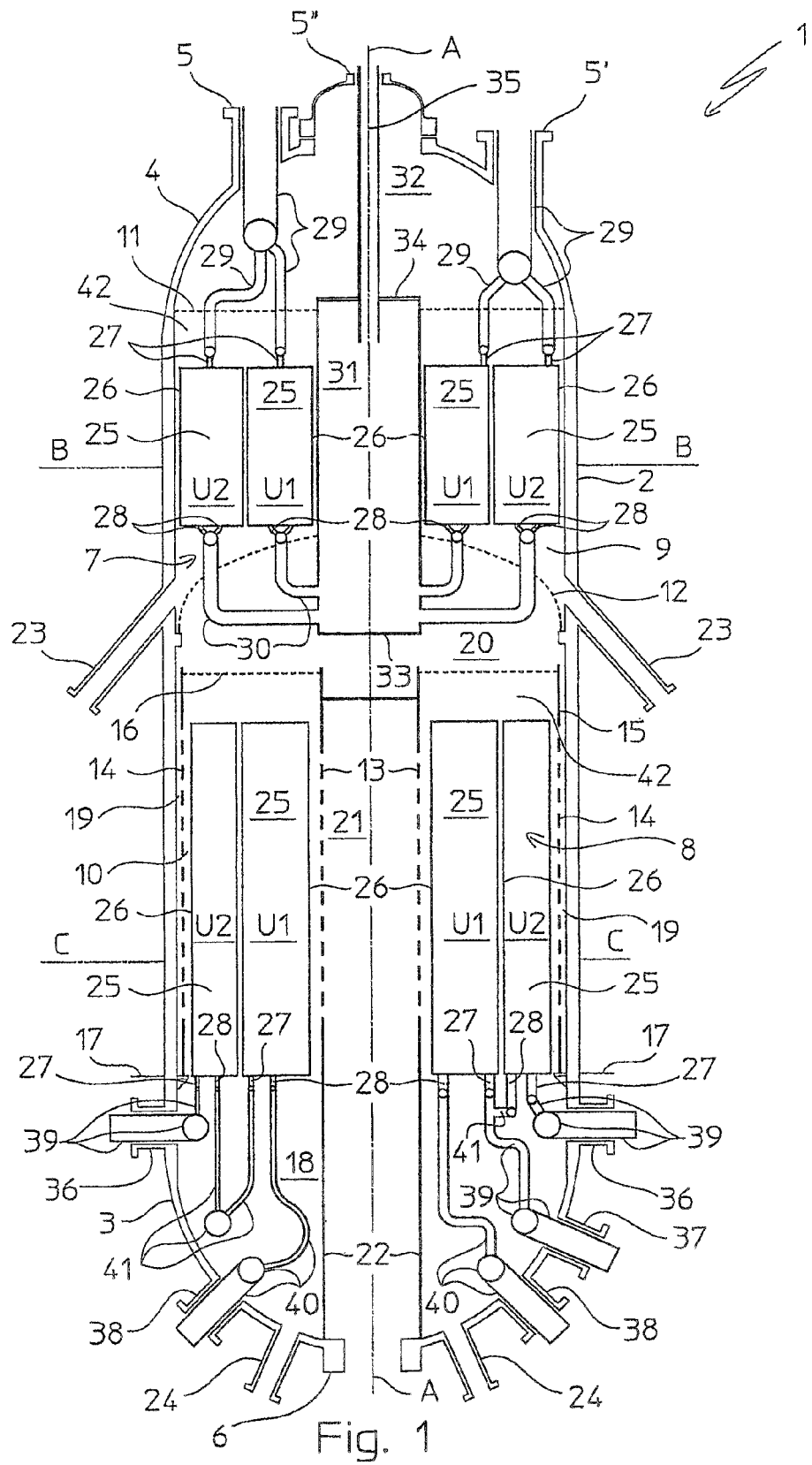
FIG. 1 schematically shows a section view of a chemical reactor according to a preferred embodiment of the present invention.

With reference to FIG. 1, a pseudo-isothermal chemical reactor, with vertical axis A-A, is globally and schematically indicated with 1, generally used for carrying out chemical reactions activated by the presence of a catalyst, in this specific (but not limiting) case for ammonia, methanol or formaldehyde synthesis.

Said reactor 1 comprises a cylindrical shell 2 and opposite covers, lower 3 and upper 4. The upper cover 4 is equipped with three openings 5, 5' and 5" for the input of reactants, whereas the lower cover 3 is equipped with an opening 6 for the discharge of the reaction products.

According to first aspect of the present invention, said shell 2 comprises two reaction zones 7 and 8, in which respective catalytic beds 9 and 10 are supported, intended for being filled with the appropriate catalyst (not shown).

The upper catalytic bed 9 is open at the top and defined between an upper line 11 and a lower, perforated, bottom 12, so as to allow the axial passage of the reactants through the catalytic bed 9.

The lower catalytic bed 10 is bound, along the direction parallel to the axis A-A, by walls 13 and 14, inner and outer respectively, of a substantially annular cylindrical basket 15 which are perforated so as to allow the radial passage of the reactants through the catalytic bed 10.

The lower catalytic bed 10 is open at the top and defined between an upper line 16 and a lower line 17. Below line 17, within the cover 3, a space 18 is provided, intended for being filled with an appropriate granular layer of inert material (not shown) to support the catalyst in the catalyst bed 10.

Between said basket 15 and the shell 2 there is a gap 19 for the distribution of the reactants inside the catalytic bed 10. Such a gap 19 and the top portion of the catalytic bed 10 (line 16) are in communication with the catalytic bed 9 through the perforated bottom 12 and a collection chamber 20 that collects the reactant/product mixture coming out from the catalytic bed 9.

Between said basket 15 and the axis A-A of the shell 2 there is a collection chamber 21 that collects the product stream coming out from the catalytic bed 10, in fluid communication with the outlet opening 6 of cover 3 through a discharge duct 22.

Both catalytic beds 9 and 10 are supported within the shell in a per se known way and therefore not described in further details in the following of the description.

Advantageously, discharge openings 23 and 24 are provided in a middle and lower portion of shell 2 for discharging the catalyst contained in catalytic beds 9 and 10, respectively.

According to a further aspect of the present invention, in the catalytic beds 9 and 10 a plurality of heat exchangers 25 is immersed and supported. Preferably, said heat exchangers 25 are plate-shaped, rectangular and box-like. These plate heat exchangers generally comprise a pair of juxtaposed metallic plates, mutually adjoined in a predetermined spaced relationship by welds so as to define between them a gap of predetermined width for the flowing of an operating heat exchange fluid.

Preferably, the exchangers 25 are arranged radially with long sides 26 parallel to the axis A-A of the shell 2 itself. Still preferably, the exchangers 25 have cross dimensions smaller than those of openings such as manhole openings (per se conventional and thus non shown) generally present in the lower and/or upper cover of the reactor. So doing it is advantageously possible to exploit these openings, which have a cross section much smaller that the shell diameter, to install within or to dismantle from the catalytic beds the exchangers 25, as well as for carrying out maintenance operations of the same.

Advantageously, said heat exchangers 25 are arranged (grouped), according to a non-limiting embodiment, on many concentric rows (two in the example), coaxial with said shell 2 (see FIGS. 2 and 3), so as to form independent heat exchanger units of annular configuration, arranged in series and/or in parallel one with respect to the other as will be described in more details in the following description.

Each exchanger 25 comprises an inlet connector 27 and an outlet connector 28 for the operating heat exchange fluid.

Said connectors are positioned on opposite short sides of said exchangers 25.

In particular, the heat exchangers 25 arranged in the upper catalytic bed 9 are in fluid communication with inlet openings 5 and 5' through tubular fittings 29 and connectors 27. On the opposite side, these exchangers 25 are in fluid communication with the inlet of the catalyst bed 9 (line 11), through connectors 28, tubular fittings 30, a central 31 and a collecting chamber 32.

The central duct 31 is cylindrical and coaxial with said shell 2 and extends through the upper catalytic bed 9. It is closed at the bottom by a non-perforated bottom plate 33 and is in fluid communication with the collection chamber 32 through a perforated upper plate 34.

Preferably, the central duct 31 is also in fluid communication with inlet opening 5," for the additional input of reactant gases, by means of a connecting duct 35 passing through the perforated upper plate 34.

On the contrary, the heat exchangers 25 arranged in the lower catalytic bed 10 are in fluid communication with inlet and outlet openings for the operating heat exchange fluid supported in the bottom cover 3. In this respect, bottom cover 3 comprises inlet openings 36 and 37 and outlet openings 38 for operating heat exchange fluid.

The bottom side of exchangers 25 in catalytic bed 10, are then in fluid communication with inlet openings 36 and 37 trough connectors 27 and tubular fittings 39. These exchangers are also in fluid communication with the outlet openings 38 through connectors 28 and tubular fittings 40. Moreover, according to a particular advantageous feature of the present invention, exchangers 25 in catalytic bed 10 are in fluid communication among them through connectors 27 and 28 and tubular fittings 41.

Figure 2:
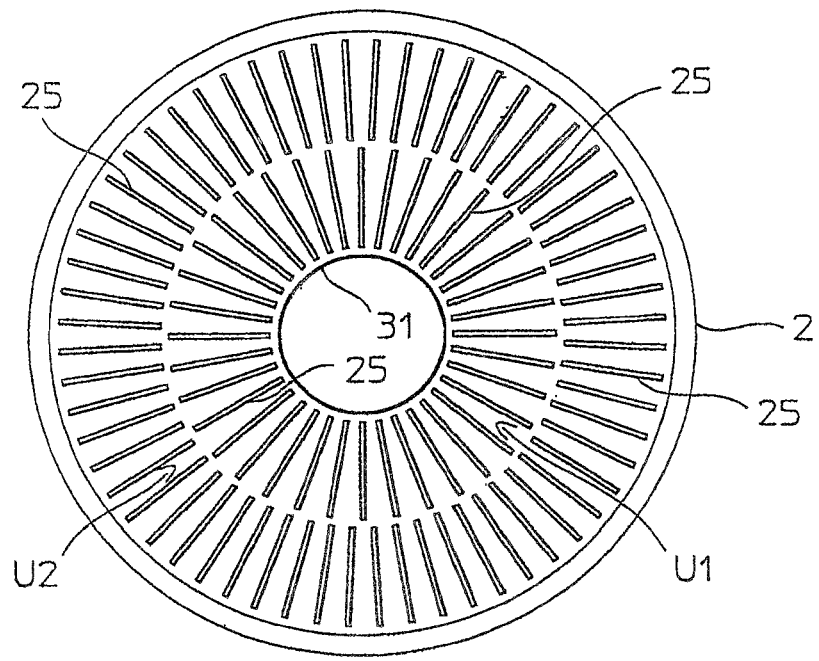
FIGS. 2 and 3 each schematically show a cross section view of the reactor of FIG. 1, taken along broken lines B-B and C-C, respectively.
Figure 3:
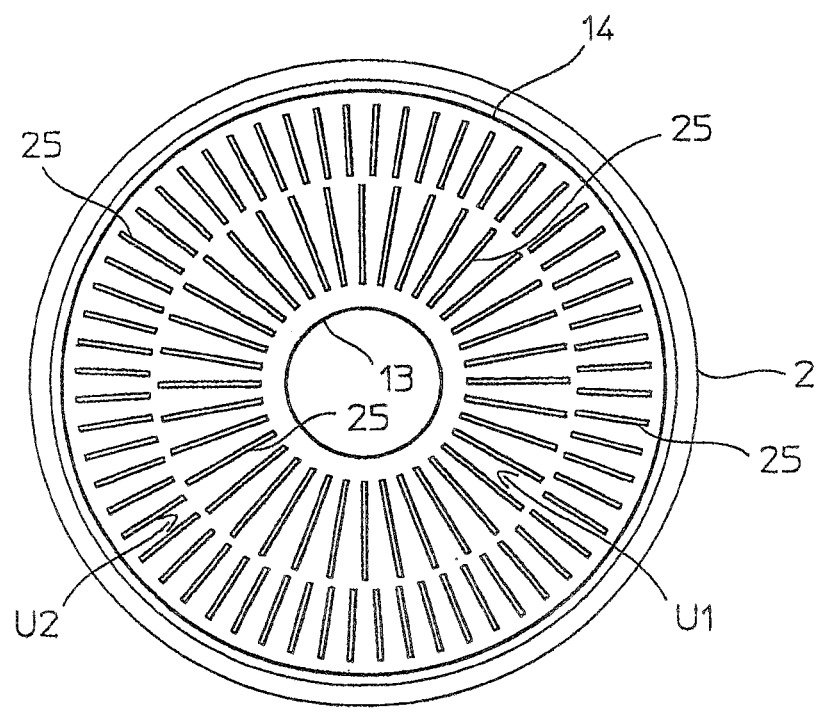

In the example shown in FIGS. 1-3, in each catalytic bed 9 and 10, two independent units U1 and U2 of heat exchangers 25 are defined. In the upper bed 9, the units are connected in parallel, while in the lower bed 10 the units are connected in series.

According to a further preferred aspect of the present invention, the heat exchangers 25 do not extend within catalytic beds 9 and 10 for all their axial lengths, and advantageously an upper portion 42 of the beds 9 and 10 is of adiabatic type, i.e. free of heat exchange elements.

With reference to the aforementioned apparatus, a flow of reactants is continuously fed to the reactor 1 through the openings 5, 5' and 5".

Such a flow is contemporaneously fed, through tubular fittings 29 and connectors 27, to the inside of the heat exchangers 25, of both units U1 and U2, arranged in the upper catalytic bed 9, where it exchanges heat with the first reaction zone 7.

Inside said exchangers 25, the flow of reactants has the function of (first) operating heat exchange fluid.

At the outlet of the heat exchangers 25, the flow of reactants is extracted thereto trough connectors 28 and tubular fittings 30 and is sent into the central duct 31.

The central duct 31 is also fed with an additional flow of "fresh" reactants coming from opening 5" through duct 35, which mix up with the flow of reactants coming from exchangers 25, and carries the whole reactant flow up to the collecting chamber 32 from which it flows down through the catalytic bed 9 in a substantial axial direction, where it partially reacts.

The reactant/product mixture coming out from the reaction zone 7, trough the perforated bottom 12, is collected in the collection chamber 20, from which, axially (through line 16) and radially (through the gap 19), it is distributed inside the second reaction zone 8.

In the second reaction zone 8, which is crossed by the reactant/product mixture in axial/radial direction, the reaction is completed.

At the outlet from the second reaction zone 8, the products flow into the collection chamber 21, from which they are conveyed to the outlet opening 6 through the discharge duct 22.

The temperature control within the second reaction zone 9 is obtained making a second operating heat exchange fluid, such as water, boiling water or melted salts and the like, to flow within the heat exchangers 25 arranged in the lower catalytic bed 10. In this case, heat is exchanged between the reaction zone 8 and the second operating heat exchange fluid, which is first fed—through openings 36, tubular fittings 39 and connectors 27—to the exchangers 25 of the outer unit U2. From these exchangers, the second operating heat exchange fluid is further fed to the exchangers 25 of the inner unit U1 through connectors 28, tubular fittings 41 and connectors 27. Finally, the second operating heat exchange fluid is extracted from unit U2 of exchangers 25 through connectors 28, tubular fittings 40 and the outlet openings 38.

In this respect, it should be noted that according to a further preferred embodiment of the invention, a portion of the second operating heat exchange fluid is directly fed to the exchangers 25 of the inner unit U1, where it mix up with the fluid coming form the exchangers of the outer unit U2, through opening 37 and tubular fittings 39.

From the above description, it is clear that units U1 and U2 of exchangers 25 in the first reaction zone 7 are advantageously operated in parallel, while units U1 and U2 in the second reaction zone 8 are advantageously operated in series. Moreover, both catalytic beds 9 and 10 are substantially of the "pseudo-isothermal" type, with a minor top portion 42 thereof of the adiabatic type, i.e. free of heat exchange elements and thus operated without temperature control.

Under certain specific circumstances, an additional appropriate catalytic bed (not shown) can be provided within shell 2, which is completely of the adiabatic type.

The reactor according to the present invention can be designed ex novo or can consist of an already existing pseudo-isothermal reactor, that has been recovered upon removal of the internal equipment (revamping of a reactor intended for being scrapped). Or, the same can consist of an already existing adiabatic reactor, which also has been freed of the internal equipment (transformation of a reactor from adiabatic to pseudo-isothermal).

Thanks to the configuration described above, it is possible to obtain a chemical reactor capable of ensuring a high production capacity and reaction yield and at the same time which is simple to manufacture, can be operated with low energy consumptions and does not require high installation and operating costs.

The presence of catalytic beds crossed by the reactant gases in a substantial axial and axial/radial direction, respectively, allows to improve the heat transfer efficiency and to better control the gas pressure drop so as to achieve the above advantages.

The presence of a single reactor shell allows to reduce the installation costs and the structural complexity of the equipment.

Moreover, the use of different operating heat exchange fluids within such a single reactor shell, as proposed in the present invention, allows to further increase the conversion yield of the reaction (due to a better control of the reaction temperature) and to improve the heat recovery thus reducing the energy consumption.

Although the reactor shown in FIGS. 1-3 can be considered as a preferred embodiment of the invention, the latter is susceptible to further embodiments and modifications to solve the above-identified technical problem, which are all covered by the scope of protection as defined in the attached claims.

In particular, according to a further embodiment of reactor 1 (not shown), the pseudo-isothermal catalytic bed 10 comprises units U1 and U2 of heat exchangers 25, which are arranged in parallel and fed with two different, independent flows of operating heat exchange fluids. To this aim, tubular fittings 41 are missing and the exchangers 25 of each unit are suitably connected to the respective external source of operating heat exchange fluid by corresponding connectors 27 and 29 and tubular fittings 39, 40. Also in this case, one of the operating heat exchange fluid can advantageously comprise reactant gases.

Thanks to the reactor according to the present invention, it is possible to obtain a method for carrying out catalytic chemical reactions, for instance for the synthesis of ammonia, methanol or formaldehyde, comprising the steps of feeding reactants to at least one reaction zone comprising a catalytic bed and a plurality of heat exchangers placed in said catalytic bed, said heat exchangers being grouped into structurally independent heat exchange units, and feeding respective different operating heat exchange fluids to said heat exchange units for controlling the reaction temperature under pseudo-isothermal conditions.

What is claimed is:

1. A method for carrying out catalytic chemical reactions, comprising the steps of:
    feeding reactants to at least one reaction zone of a chemical reactor comprising at least two reaction zones each supporting a respective catalytic bed and a plurality of heat exchangers placed in said catalytic bed, said heat exchangers being grouped into at least two structurally independent heat exchange units; and
    feeding respective different operating heat exchange fluids to said heat exchange units for controlling the reaction temperature under pseudo-isothermal conditions,
    wherein said different operating heat exchange fluids are fed to the heat exchange units in said reaction zones, respectively, so that the heat exchange units of a first catalytic bed are fed in parallel by a first operating heat exchange fluid while the heat exchange units of a second catalytic bed are connected in series and flown one after the other by a second operating heat exchange fluid.

2. The method according to claim 1, wherein said different operating heat exchange fluids are chosen among the group comprising: reactant gases, water, boiling water or melted salts.

* * * * *